United States Patent [19]
Reinartz et al.

[11] Patent Number: 5,511,864
[45] Date of Patent: Apr. 30, 1996

[54] ELECTROMAGNETIC VALVE, IN PARTICULAR FOR HYDRAULIC BRAKING SYSTEMS PROVIDED WITH A SLIP CONTROL

[75] Inventors: Hans-Dieter Reinartz, Frankfurt am Main; Erhard Beck, Weilburg; Dieter Dinkel, Eppstein, all of Germany

[73] Assignee: ITT Automotive Europe GmbH, Germany

[21] Appl. No.: 313,281

[22] PCT Filed: Feb. 22, 1993

[86] PCT No.: PCT/EP93/00410

§ 371 Date: Oct. 4, 1994

§ 102(e) Date: Oct. 4, 1994

[87] PCT Pub. No.: WO93/19961

PCT Pub. Date: Oct. 14, 1993

[30] Foreign Application Priority Data

Apr. 4, 1992 [DE] Germany .................. 42 11 307.5

[51] Int. Cl.⁶ .................................................. B60T 8/36
[52] U.S. Cl. ................... 303/119.2; 303/113.1; 303/901; 303/900
[58] Field of Search ................. 303/119.2, 119.1, 303/113.1, 113.2, 900, 901, 87; 251/129.15, 129.02; 137/596.17

[56] References Cited

U.S. PATENT DOCUMENTS 4,620,565  11/1986  Brown .
4,638,974  1/1987   Zeuner et al. .

FOREIGN PATENT DOCUMENTS

| | | |
|---|---|---|
| 0209737 | 1/1987 | European Pat. Off. . |
| 0238387 | 9/1987 | European Pat. Off. . |
| 0265885 | 5/1988 | European Pat. Off. . |
| 0334029 | 9/1989 | European Pat. Off. . |
| 0423755 | 4/1991 | European Pat. Off. . |
| 2640215 | 6/1990 | France . |
| 2849722 | 5/1979 | Germany . |
| 2823257 | 11/1979 | Germany . |
| 3833475 | 4/1990 | Germany . |
| 4030971 | 4/1992 | Germany . |
| 4112920 | 10/1992 | Germany . |
| 2219055 | 11/1989 | United Kingdom . |
| 2252374 | 8/1992 | United Kingdom . |

*Primary Examiner*—Douglas C. Butler
*Attorney, Agent, or Firm*—Dykema Gossett

[57] ABSTRACT

An electromagnetic valve that is easily manufactured and has a coaxially adjustable valve seat thereby allowing customized selection of valve components. A precise adjustment of the aial air gap is permitted on the hold-on magnet. An individual selection of a diaphragm member situated within a valve seat member is provided for with the diaphragm member being detachably connected to the valve seat member and with the diaphragm member having an outwardly flared open end.

5 Claims, 2 Drawing Sheets

ELECTROMAGNETIC VALVE, IN PARTICULAR FOR HYDRAULIC BRAKING SYSTEMS PROVIDED WITH A SLIP CONTROL

TECHNICAL FIELD

The present invention relates to electromagnetic valves, and in particular, electromagnetic valves for hydraulic braking systems provided with a slip control.

BACKGROUND OF THE INVENTION

German Patent Application No. P 41 41 546.9 teaches an electromagnetic valve (for controlling pressure fluid flow), that includes a valve seat member firmly caulked within a valve supporting member, wherein the valve seat member comprises a diaphragm bore. The valve seat member, prior to final valve assembly, is placed into the bore section of a valve support member so that the adjustment of the valve seat member (oriented by the tolerances of the individual components) cannot be effected. The valve seat member is positioned to conform to the shape of the bore step and is held in caulked position. Moreover, the electromagnetic valve described in the afore-mentioned patent application has the disadvantage that, as a result of the limited structural volume available, no provision is made for the integration in the valve support member of a check valve which is a common requirement for hydraulic braking systems having a slip control. A further disadvantage is found in the afore-mentioned valve inasmuch as the diaphragm bore with the valve seat member forms a unit caulked within the valve support member, no individual adjustment of the diaphragm can be performed.

It is, therefore, the object of the invention to provide an easy-to-manufacture electromagnetic valve enabling, by simple means, a precise adjustment of the axial air gap required between the magnetic core and the hold-on magnet and permitting customs selection of the diaphragm member without requiring any substantial modification of the electromagnetic valve.

These objects, in the practice of the invention, have been fulfilled by the present invention which includes a valve seat member that is coaxially displaceable with respect to a valve needle, thereby providing in a simple manner, through a corresponding design of the valve support member and the valve seat member, a versatile and compact electromagnetic valve.

Advantageous embodiments of the invention are hereinafter described and explained in closer detail in connection with additional features and advantages of the invention and with reference to the drawings, a brief description of which follows.

BRIEF DESCRIPTION OF THE DRAWINGS

Referring to the drawings, FIG. 1 shows a cross-section through the electromagnetic valve of the present invention open in the basic position. The electromagnetic valve is located in a block-type valve-accommodating member 8 (not specified in any closer detail) which is preferably made of aluminum. Individually, the following description refers to the components of the electromagnetic valve that are of inventive relevance.

Figure 1:
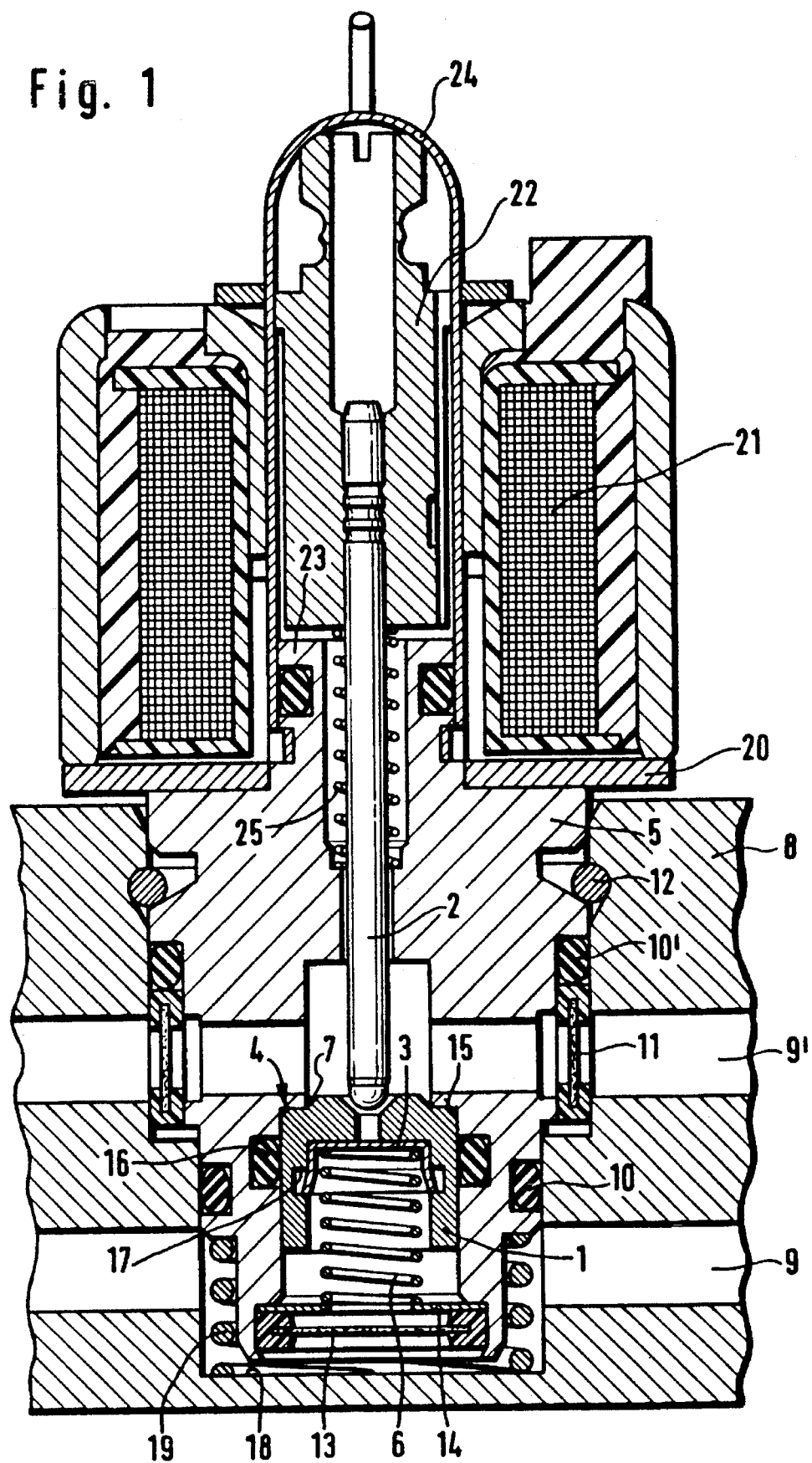
FIG. 1 is a cross-sectional view of an electromagnetic valve open in the basic position.

The electromagnetic valve comprises the valve support member 5 inserted in the stepped housing bore of the valve-accommodating member 8. The valve supporting member 5 functions to control the flow of fluid through the pressure fluid channels 9,9' provided in the housing bore. Valve support member 5 is sealed within the stepped housing bore by way of circumferential seals 10,10'. The various dimensions of the valve support member 5 are so adapted to the housing bore that a recess is provided circumferentially about the valve supporting member 5 (which, in the drawing, is located at the level of the valve closure member) such that an annular chamber of the housing accommodating an annular filter 11 is created which, through the pressure fluid channel 9' configured as a transverse bore, establishes the pressure fluid connection between the pressure fluid channel 9 (which, in the drawing, is located below the valve needle 2), and the afore-mentioned pressure fluid channel 9'. The annular chamber of the housing accommodates, in addition to the annular filter element 11, the sealant 10' thereabove sealing the valve support member 5 vis-a-vis the valve-accommodating member 8.

Provided above the said sealant 10', circumferentially of the valve support member, is a sloping annular groove for accommodating a snap ring 12 catching a groove of the valve-accommodating member 8. Similarly, the pressure fluid channel 9 terminating, in the drawing, below the valve seat, includes a plate filter element 13, thereby preventing ingress of dirt from all sides through the passage opening provided in the valve seat and the diaphragm member 3. A compression spring 6 is supported on a stop disc 14 coupled ahead of the plate filter element 13. Compression spring 6 holds the valve seat member 1 provided with the diaphragm member 3, against a housing stop 15.

The valve seat member 1, within a bore section (coaxially aligned with the valve needle 2), is guided in a manner axially movable and is circumferentially sealed by a sealant 16 inserted in an inner annular groove of the valve supporting member 5. The cap-shaped diaphragm member 3 (preferably made of a thin-press part as a result of its spreading effect corresponding to the effect of a clip), engages an inner annular groove 17 of the valve seat member 5 substantially of hollow cylindrical configuration. The depth dimensions of the bore step 7 in the valve accommodating-member 8 are to be selected larger than the stepped length of the valve supporting member 5 such that an adequate axial assembly play is permanently insured. Moreover, for the purposes of the valve assembly and for preventing an inadvertent excessive impression of the valve in the valve-accommodating member 8, it is feasible to provide a compression spring 19 of correspondingly stiff dimension which is supported between the bore bottom 18 and the valve supporting member 5. This relatively stiff compression spring 19 causes the valve supporting member 5 to remain, in all operating modes, in abutment with the snap ring 12.

The valve supporting member 5, preferably, is made of ferromagnetic steel and is provided with a steel disc 20 for controlling the magnetic flow. The steel disc 20 closes the magnetic circuit between the magnetic coil 21 associated thereto and the valve supporting member 5. The steel disc 20 (as a lose part above the extension 23 extending in the direction of the hold-on magnet 22) is centered on the valve supporting member 5. Also secured to the hollow-cylindrical extension 23 is the valve sleeve 24 enclosing the hold-on magnet 22. The valve sleeve 24 is held on the extension 23 by a connection formed through indentation. A sealant is provided between the extension 23 and the valve sleeve 24 for sealing the said point of fixation. Other types of fixation, such as welding or clamping connections, can equally be used without requiring a separate sealant.

MANNER OF OPERATION

The manner of operation of the features of the invention will be described in closer detail with reference to the afore-described details of the electromagnetic valve according to FIG. 1.

FIG. 1 shows the electromagnetic valve in the electromagnetically non-actuated (open) position. The valve needle 2, due to the effect of the compression spring 25 clamped between the valve supporting member 5 and the hold-on magnet 22, is removed from the valve seat. Hence, there is an open pressure fluid communication between the two pressure fluid passageways 9,9'.

When electromagnetically actuating the valve, the valve needle 2 closes the pressure fluid passageway through the valve seat member 1 (provided the force of the appertaining compression spring 6 exerted on the valve seat member 1 is at least equal to or larger than the electromagnetic regulating force and the hydraulic counter-acting force resulting from the pressure difference in the two pressure fluid passageways 9,9').

The valve of the present invention operates as follows when used in conjunction with an antilock brake system (ABS). When used in an ABS, the braking pressure holding phase within the system (in the anti-locking mode) causes a pressure decrease in the pressure fluid passageway 9 (which, in FIG. 1, is the lower passageway) as effected by releasing the brake pedal. Then the pressure fluid enclosed in the pressure fluid passe&away 9' (which, in FIG. 1, is the upper one) leading to the pressure fluid user (wheel brake) displaces the valve seat member 1 against the compression spring 6. Consequently, the wheel brake pressure, through the valve seat moving away from the valve needle 2 and through the diaphragm opening is passed into the pressure fluid passageway 9. This integrates, in a structurally simple way, a check valve function between the pressure fluid passageway 9' (pressure fluid user) and the second pressure fluid passageway 9 (pressure fluid supplier).

Figure 2:
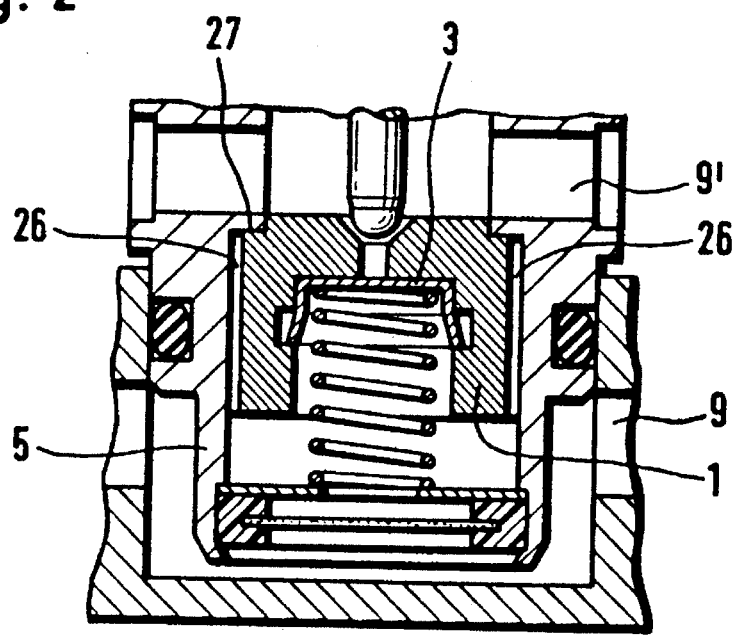
FIG. 2 is an alternative form of embodiment of the valve seat member within a sectionally shown electromagnetic valve.

FIG. 2 shows an alternative form of embodiment of the valve seat member 1 provided with a check valve function. The valve seat member 1 differs from the one of FIG. 1 by the provision of elongated grooves 26 circumferentially of the valve seat member, thereby causing the annular area of the valve seat member 1 normally in abutment with the valve supporting member 5 to act as a sealing seat face 27 which, after removal from the valve supporting member 5, causes the pressure fluid to escape from the pressure fluid passageway 9' (wheel brake on the user side) through the elongated grooves 26 of a relatively low flow resistance towards the pressure fluid supplier (master brake cylinder) connected to the pressure fluid passageway 9.

Figure 3:
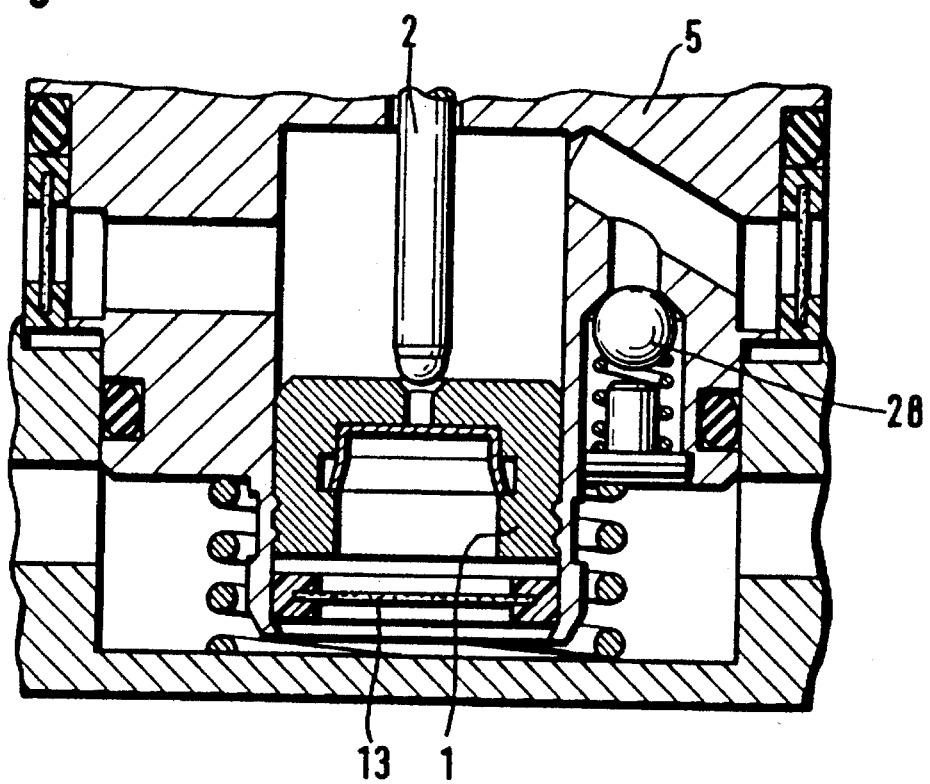
FIG. 3 shows another form of embodiment of the valve seat member and of the check valve.

As opposed to the afore-described embodiments, FIG. 3 shows a valve seat member 1 adjustable in the valve supporting member 5 for precisely adjusting the axial air gap between the pre-mounted hold-on magnet and the magnetic core and the valve supporting member, respectively. During axial alignment of the valve seat member 1 within the valve supporting member 5, the valve needle 2 is in abutment with the valve seat body 1 such that the axial air gap can be measured. After adjustment of the valve seat member 1, the same is fixed to the valve supporting member 5, for example, by radial compression, whereafter the plate filter element 13 can be inserted and caulked. The check valve function is ensured by a ball check valve 28 operatively and structurally disposed in parallel to the valve seat member 1 within the valve supporting member 5.

To precisely maintain the axial air gap, it is additionally referred to the adjustment of the valve seat member 1 according to FIG. 3 in reference to FIGS. 1 and 2. For this purpose, the valve seat member 1 is manufactured at low cost with a variety of valve seat tolerances. In valve seat members having a horizontal sealing seat face 27, the axial air gap is adjustable by using spacers of varying strength in analogy to the afore-described process of selection. Irrespective of this process, the diaphragm member, at any time, is replaceable in view of the detachable connection thereof within the valve seat member 1.

We claim:

1. An electromagnetic valve, comprising:

a valve support member having a valve sleeve sealed to said valve support member a valve accommodating member enclosing said support member, a hold-on magnet enclosed by the valve sleeve performing a stroke in response to an electrically energizable magnetic coil provided on the valve sleeve, a valve needle attached to the hold-on magnet, a valve seat member fixed within the valve support member and adapted to engage said valve needle to control a pressure fluid communication between at least one first and one additional pressure fluid passageway, wherein said valve seat member is cap shaped and open opposite the valve needle and has an annular groove therein, and is coaxially displaceable with respect to the valve needle, and a detachably connected cap shaped diaphragm member seated within the valve seat member, an outwardly flared open end engaging the annular groove of the valve seat member.

2. An electromagnetic valve, comprising: a valve support member having a valve sleeve sealed to the valve support member, a valve accommodating member enclosing said support member, a hold-on magnetic enclosed by the valve sleeve performing a stroke in response to an electrically energizable magnetic coil provided on the valve sleeve, a valve needle attached to the hold-on magnetic, a valve seat member fixed within the valve support member and adapted to engage said valve needle to control a pressure fluid communication between at least one first and one additional pressure fluid passageway, wherein said valve seat member is cap shaped and open opposite the valve needle and has an annular groove therein, and a detachably connected cap shaped diaphragm member seated within the valve seat member, and having an outwardly flared open end engaging the annular groove of the valve seat member.

3. An electromagnetic valve according to claim 2, further including a check valve operatively disposed in parallel to the seat member, said check valve disposed in the valve support member.

4. An electromagnetic valve according to claim 3, wherein the check valve comprises the valve seat member and a compression spring loading the valve seat member in the direction of the valve needle, with the compression spring being supported on a stop part fixed within the valve support member at a distance from the valve seat member.

5. An electromagnetic valve according to claim 3, wherein the valve seat member with the front face thereof, under the effect of the compression spring, can be placed in sealing abutment with a bore step of the valve support member.

* * * * *